3,585,226
SPIROCYCLIC LEAD COMPOUNDS
Kenneth C. Williams, Baton Rouge, La., assignor to
Ethyl Corporation, New York, N.Y.
No Drawing. Filed Feb. 10, 1969, Ser. No. 798,158
Int. Cl. C07f 7/24
U.S. Cl. 260—437                                 7 Claims

ABSTRACT OF THE DISCLOSURE

The synthesis of 5-plumbaspiro [4.4] nonane and related compounds from a di-Grignard reagent and lead halide.

---

Prior to this invention the synthesis of a spirocyclic lead compound had not been reported.

This invention provides spirocyclic lead compounds exemplified by 5-plumbaspiro [4.4] nonane. These compounds may be prepared by reacting the di-Grignard reagent of a 1,4-dihalobutane with a lead dihalide:

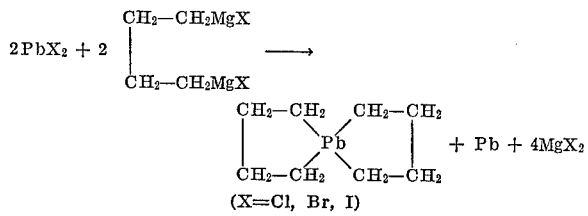

(X=Cl, Br, I)

The preferred lead dihalide is $PbCl_2$ and the preferred di-Grignard reagent is butane-1,4-dimagnesium chloride. The 1,4-dihalobutane of the di-Grignard reagent may be substituted with non-interfering groups. For example the use of 2-methylbutane-1,4-dimagnesium halide results in the formation of 2,7-dimethyl-5-plumbaspiro [4.4] nonane. Similarly, when the di-Grignard is pentane-1,4-dimagnesium halide, 1,6-dimethyl-5-plumbaspiro [4.4] nonane may be produced. Other spiro compounds which may be made in the analogous manner include 2,7-dimethoxy-5-plumbaspiro [4.4] nonane, 1,4,6,9-tetramethyl-5-plumbaspiro [4.4] nonane, 2,3,7,8-tetramethyl-5-plumbaspiro [4.4] nonane and the like.

Reaction temperatures within the range of from about 5 to about 85° C. will be found suitable. In most cases reactions at about room temperature (e.g., 25–30° C.) are quite satisfactory.

The reaction is conducted most conveniently in an ethereal reaction medium. While any customary ether solvent may be used it is preferred to employ an ether having a relatively low boiling point (e.g., below about 100° C.) as this facilitates the workup procedure. Exemplary ethers include tetrahydrofuran, 1,3-dioxolane, the dimethyl ether of ethylene glycol, diethyl ether, diisopropyl ether, methylethyl ether, methyl isopropyl ether, methyl butyl ether, methyl isobutyl ether, ethyl propyl ether, ethyl isopropyl ether, ethyl isobutyl ether, and the like.

The reaction system should be kept essentially anhydrous so as to avoid hydrolysis of the Grignard reagent and the spiro lead compound. The reaction should be conducted under an inert atmosphere.

EXAMPLE 5-plumbaspiro [4.4] nonane

The di-Grignard reagent of 1,4-dichlorobutane was prepared from 15.2 g. (0.12 M) of the dichlorobutane and an excess of magnesium metal in 600 ml. of tetrahydrofuran. After the exothermic reaction subsided the di-Grignard solution was heated at reflux for 30 minutes to insure complete reaction. To the freshly prepared and filtered di-Grignard reagent was added 27.8 g. (0.1 M) of lead chloride while maintaining the temperature at 25–30° C. Lead metal separated and a yellow solution was obtained which became colorless when heated at reflux for 15 minutes. After tetrahydrofuran was removed by distillation at reduced pressure, the residue was extracted twice with 200 ml. of portions of pentane. Evaporation of the pentane gave a crude product which was vacuum distilled to give 10.5 g. (65.8%) of colorless liquid boiling at 63–64° C. (1 mm.).

Analysis.—Calcd. for $C_8H_{16}Pb$ (percent): Pb, 64.87. Found (percent): Pb, 64.9 (average of three analyses).

The above reactions were carried out under a nitrogen atmosphere. Tetrahydrofuran was distilled from lithium aluminum hydride before use in order to insure dryness.

5-plumbaspiro [4.4] nonane is a dense ($d^{25}$=2.025 g./ml.), colorless liquid which boils at 63–67° C. (1 mm.) without decomposition, but upon standing it slowly decomposes as evidenced by formation of yellow polymeric solids.

On exposure to light the spirocyclic lead compound forms a lead-containing solid polymer of rubbery consistency which may be useful in radiation shielding applications. 5-plumbaspiro [4.4] nonane is soluble in gasoline and exhibits antiknock properties. It burns rapidly and thus may find application as an ignition improver for difficulty ignitable fuels.

What is claimed is:

1. 5-plumbaspiro [4.4] nonane.
2. A process of preparing spirocyclic lead compounds which comprises reacting the di-Grignard reagent of a 1,4-dihalobutane with lead dihalide in an essentially anhydrous ethereal reaction medium.
3. The process of claim 2 when conducted in tetrahydrofuran.
4. The process of claim 2 when conducted at about room temperature.
5. The process of claim 2 when conducted in tetrahydrofuran at about room temperature.
6. The process of claim 2 wherein said Grignard reagent is butane-1,4-dimagnesium chloride and wherein said lead dihalide is lead dichloride.
7. The process of claim 2 wherein said Grignard reagent is butane-1,4-dimagnesium chloride, wherein said lead dihalide is lead dichloride and wherein the reaction medium is composed of tetrahydrofuran.

References Cited

UNITED STATES PATENTS 2,160,915   6/1939   Schreiber _____ 260—437X

OTHER REFERENCES

Juenge et al., J. Organometal. Chem., vol. 10, pp. 465–70 (1967).

Leeper et al., Chemical Reviews, vol. 54, pp. 108–9 (1954).

Shapiro et al., The Organic Compounds of Lead, John Wiley & Sons, New York, pp. 341–4, 352 and 353 (1968).

TOBIAS E. LEVOW, Primary Examiner

H. M. S. SNEED, Assistant Examiner

U.S. Cl. X.R.

44—69; 252—386; 260—2